United States Patent

Horikawa et al.

[11] Patent Number: 5,949,751
[45] Date of Patent: *Sep. 7, 1999

[54] OPTICAL RECORDING MEDIUM AND A METHOD FOR REPRODUCING INFORMATION RECORDED FROM SAME

[75] Inventors: Kunihiko Horikawa; Eiji Muramatsu, both of Saitama-ken, Japan

[73] Assignee: Pioneer Electronic Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,265

[22] Filed: Sep. 4, 1996

[30] Foreign Application Priority Data

Sep. 7, 1995 [JP] Japan ................... 7-255671

[51] Int. Cl.$^6$ ..................................... G11B 7/24
[52] U.S. Cl. ........................... 369/275.2; 369/13
[58] Field of Search ............... 369/13, 94, 275.1–275.4, 369/284, 285, 286, 288

[56] References Cited

U.S. PATENT DOCUMENTS

| | | | |
|---|---|---|---|
| 4,769,802 | 9/1988 | Tatsuguchi | 369/275.3 |
| 5,063,097 | 11/1991 | Hirota et al. | 369/288 |
| 5,191,565 | 3/1993 | Inoue et al. | 369/286 |
| 5,270,995 | 12/1993 | Wada et al. | 369/275.1 |
| 5,305,303 | 4/1994 | Akahira et al. | 369/275.4 |
| 5,390,162 | 2/1995 | Fukumoto et al. | 369/275.2 |
| 5,398,219 | 3/1995 | Itoh et al. | 369/275.2 |
| 5,410,534 | 4/1995 | Nagata et al. | 369/275.2 |
| 5,432,774 | 7/1995 | Fukumoto et al. | 369/275.2 |
| 5,434,844 | 7/1995 | Miyamoto et al. | 369/275.2 |
| 5,442,619 | 8/1995 | Van Uijen et al. | 369/275.2 |
| 5,485,452 | 1/1996 | Maeda | 369/275.1 |
| 5,569,517 | 10/1996 | Tominaga et al. | 369/275.2 |
| 5,580,632 | 12/1996 | Ohkawa et al. | 369/275.2 |
| 5,583,847 | 12/1996 | Takeshima et al. | 369/275.2 |
| 5,591,501 | 1/1997 | Ovshinsky et al. | 369/275.4 |
| 5,592,461 | 1/1997 | Tsujioka et al. | 369/275.2 |
| 5,598,398 | 1/1997 | Best et al. | 369/275.4 |
| 5,606,546 | 2/1997 | Best et al. | 369/275.1 |
| 5,608,715 | 3/1997 | Yokogawa et al. | 369/275.1 |
| 5,627,817 | 5/1997 | Rosen et al. | 369/275.1 |
| 5,659,537 | 8/1997 | Hirokane et al. | 369/275.2 |
| 5,666,346 | 9/1997 | Nishimura | 369/275.2 |
| 5,681,633 | 10/1997 | Onagi et al. | 369/275.2 |
| 5,691,072 | 11/1997 | Izumi et al. | 369/275.2 |
| 5,709,978 | 1/1998 | Hirotsume et al. | 369/121 |
| 5,726,970 | 3/1998 | Kaneko et al. | 369/275.2 |
| 5,759,657 | 6/1998 | Onagi et al. | 369/275.2 |

FOREIGN PATENT DOCUMENTS 63-276732  11/1988  Japan ................... 369/275.2

Primary Examiner—Nabil Hindi
Attorney, Agent, or Firm—Morgan, Lewis & Bockius LLP

[57] ABSTRACT

The optical recording medium includes a first layer which is in a state that includes different phases having different optical constants and in which information has been recorded. The second layer is capable of changing states, which states include different phases and different optical constants. There is also provided a method of reproducing information recorded on an optical recording medium which includes a first layer having different phases and different optical constants and a second layer capable of changing states, which states include different phases and different optical constants. The method employs irradiating the second layer with a laser beam, and reproducing information recorded on the first layer from an area corresponding to an area of the second layer where the optical constants change due to laser irradiation.

10 Claims, 5 Drawing Sheets

|← 7 →|

BEAM SPOT DIAMETER

|← 8 →|

(REPRODUCTION AUXILIARY LAYER : AMORPHOUS)

(REPRODUCTION AUXILIARY LAYER : CRYSTAL)

BEAM SPOT DIAMETER

BEAM SPOT DIAMETER

BEAM SPOT DIAMETER

EFFECTIVE DIAMETER
FOR REPRODUCTION

OPTICAL RECORDING MEDIUM AND A METHOD FOR REPRODUCING INFORMATION RECORDED FROM SAME

BACKGROUND OF THE INVENTION

The present invention relates to an optical recording medium such as an optical disc on which high density information has been recorded by means of a laser beam. The present invention also relates to a method for reproducing information recorded on such optical recording medium.

In recent years, proposals surfaced for a Super Image Dissection Reproducing Technique where high density information may be reproduced with the use of pits smaller than a laser beam spot For instance, there has been a suggestion that a chalcogen amorphous material such as $Sb_2Se_3$ be employed, so that high density information may be reproduced by making use of a phenomenon called Reflectance Change which is caused by a reversible phase change between an amorphous state and a crystallized state (Japanese Patent Application Laid-open 3-292632).

According to this prior art, a film of a phase change material is formed on a transparent substrate in which signal pits have already been formed in accordance with information signals. When the laser beam is applied to the phase change material, the rising temperature of the phase change material within the applied laser beam spot causes the reflectance to rise so as to form a high reflectance area (amorphous state). In reproduction, only pits within the high reflectance area are detected, and high density reproduction may be effected by making use of Reflectance Change, i.e., a fact that an information reproducing area is a high reflectance area and other areas are low reflectance areas.

Namely, the technique disclosed in the above prior art is useful for an optical disc of the ROM (Read Only Memory) type which includes a transparent substrate having signal pits formed in advance, and a single layer of phase change material formed on the transparent substrate.

However, there has not been suggested a technique useful for other types of optical recording medium such as the Write Once, the Read Many type, or the Rewritable type: with which can record information and reproduce the information at any desired time.

Moreover, even with the technique being useful only for the ROM type optical disc, the reflectance of areas (masked areas) other than the information reproducing area are required to be sufficiently lower than that of the information reproducing area, but with respect to the focus servo, it is required that the masked areas should have a high reflectance.

SUMMARY OF THE INVENTION

An object of the present invention is to solve the above-mentioned problems peculiar to the above-mentioned prior arts, so as to provide an improved optical recording medium and a method for reproducing information recorded in such an improved optical recording medium, thereby making it possible to reproduce high density information recorded in a rewritable type optical recording medium.

According to a first aspect of the present invention, there is provided an optical recording medium comprising a first layer which is in a state that includes different phases having different optical constants and in which information has been recorded, and a second layer capable of changing states, including different phases having different optical constants.

According to a second aspect of the present invention, there is provided a method of reproducing information recorded on an optical recording medium which is comprised of a first layer including different phases having different optical constants and a second layer capable of changing to different states, and phases with different optical constants. The method comprises irradiating the second layer with a laser beam, and reproducing information recorded in the first layer from an area corresponding to an area of the second layer where the optical constants changes due to the laser irradiation.

The above objects and features of the present invention will become better understood from the following description with reference to the accompanying drawings.

BRIEF DESCRIPTION OF DRAWINGS

FIG. 1a is an explanatory view showing that a laser beam spot is being applied to an optical recording medium of the present invention.

FIG. 1b is a cross sectional view showing the optical, recording medium of FIG. 1a.

FIG. 1c is graph showing a temperature distribution of an irradiated area of the optical recording medium of FIG. 1a.

FIG. 3a is an explanatory view showing that a laser beam spot is being applied to another optical recording medium of the present invention.

FIG. 3b is a cross sectional view showing the optical recording medium of FIG. 3a.

FIG. 3c is graph showing a temperature distribution of an irradiated area of the optical recording medium of FIG. 3a.

FIG. 4a is a graph showing a relationship between the thickness of a recording layer and its reflectance, using materials different from those in FIG. 2a.

FIG. 4b is a graph showing another relationship between the thickness of a recording layer and its reflectance, using materials different from those in FIG. 2a.

DETAILED DESCRIPTION OF THE PREFERRED EMBODIMENTS

Figure 5:
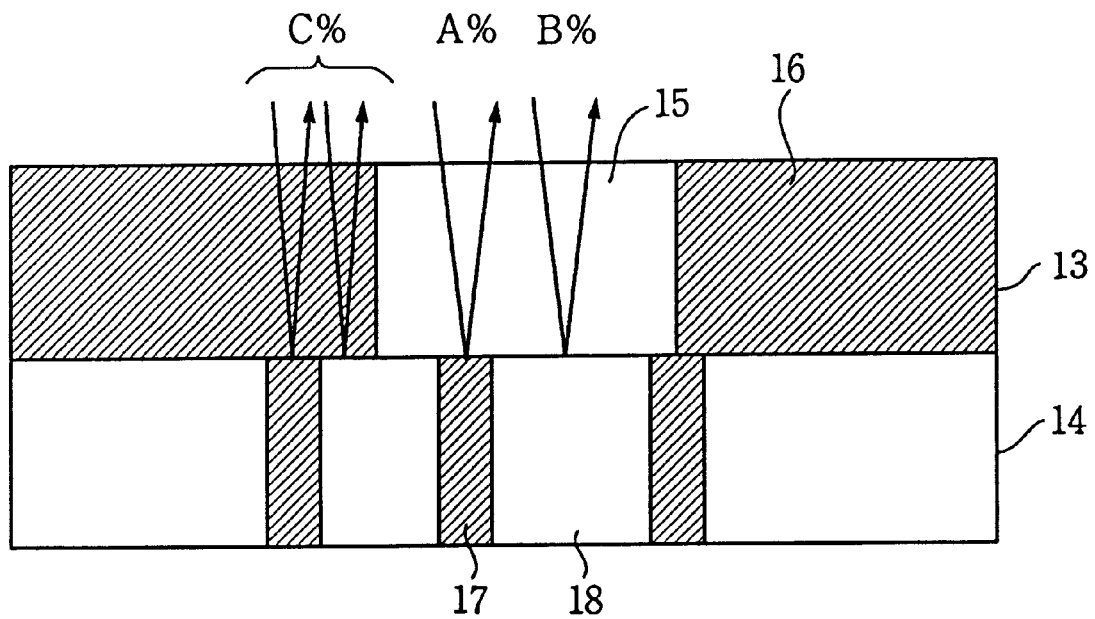
FIG. 5 is a cross sectional view showing an important part of the optical recording medium of the present invention, and principle of how to reproduce information recorded in such recording medium.

FIG. 5 is a cross sectional view indicating the structure of an optical recording medium of the present invention and the principle of how to reproduce information recorded therein.

Referring to FIG. 5, the optical recording medium comprises a recording layer 14 and a reproduction auxiliary layer 13. The recording layer 14 includes information signal areas 17 (e.g. crystallized state) and non-information signal areas 18 (e.g. amorphous state). The reproduction auxiliary layer 13 employs a material which under room temperature is in a stabilized crystallized state 16, but will change into an amorphous state 15 upon being irradiated with a laser beam during reproduction. The amorphous state 15 is an area which has been melted to a temperature higher than its melting point, but will change back into its original stabilized crystallized state upon being cooled to a temperature below its melting point.

The principle for reproducing information recorded in the above medium will be described as follows.

Referring to FIG. 5, a laser beam from above the auxiliary layer 13 is multiple-reflected on an interface between the recording layer 14 and the auxiliary layer 13, produces a reflected light returning back to the space above the auxiliary layer 13, serving as an information reproducing signal or focus servo signal. With the optical recording medium shown in FIG. 5, there are four kinds of reflected lights.

(I) When the reflected light is coming from the area 15 (optical constant N1) of the reproduction auxiliary layer 13 and the area 17 (optical constant N3) of the recording layer 14, the reflected light has a reflectance of A %.

(II) When the reflected light is coming from the area 15 (optical constant N1) of the reproduction auxiliary layer 13 and the area 18 (optical constant N4) of the recording layer 14, the reflected light has a reflectance of B % (B is not equal to A)

(III) When the reflected light is coming from the area 16 (optical constant N2) of the reproduction auxiliary layer 13 and the area 17 (optical constant N3) of the recording layer 14, the reflected light has a reflectance of C %.

(IV) When the reflected light is coming from the area 16 (optical constant N2) of the reproduction auxiliary layer 13 and the area 18 (optical constant N4) of the recording layer 14, the reflected light has a reflectance of C %.

It is understood that within an area irradiated by a laser beam spot as shown in FIG. 5, reflecting light percentages as described in categories (I) and (II) are different due to different reflectances of each area, and such a difference in light reflecting percentages can serve as a signal for detection, thus making it possible to reproduce information recorded in the recording layer 14. This may also be explained as follows. Due to multiple optical interference between the recording layer 14 and the reproduction auxiliary layer 13, reflected lights from certain areas will become, comparatively speaking, stronger, and reflected lights from other areas will become, comparatively speaking, weaker.

As indicated in FIG. 5, the quantity of reflected light in above category (T) is different from that in category (II), thereby making it possible to detect information signals in the area of optical constant NI on the reproduction auxiliary layer 13. On the other hand, while the laser beam is being applied to the area 16 of optical constant N2 on the reproduction auxiliary layer 13, no information signal is able to be detected because the quantities of all the reflected lights will be almost the same no matter whether they are reflected from the area 17 of optical constant N3, or the area 18, of optical constant N4.

Figure 1:
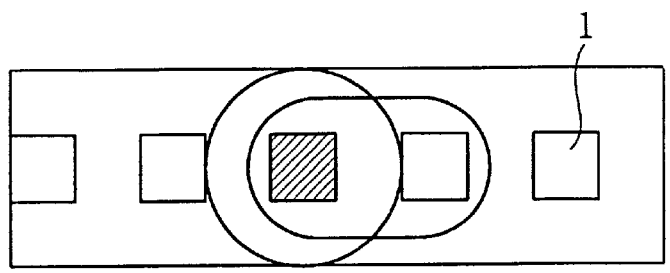
Figure 1:
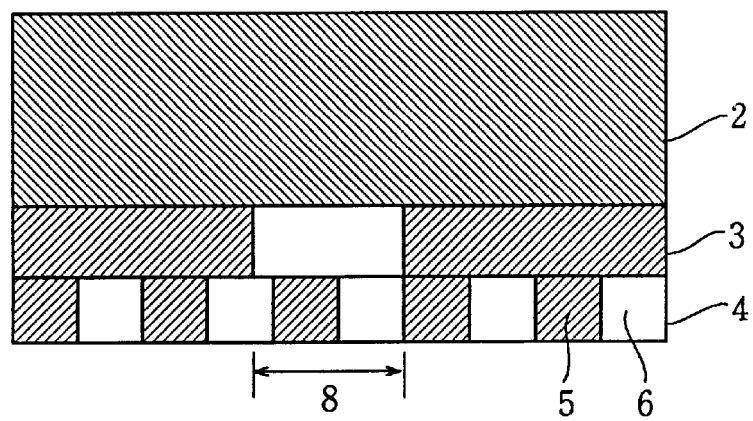
Figure 1:
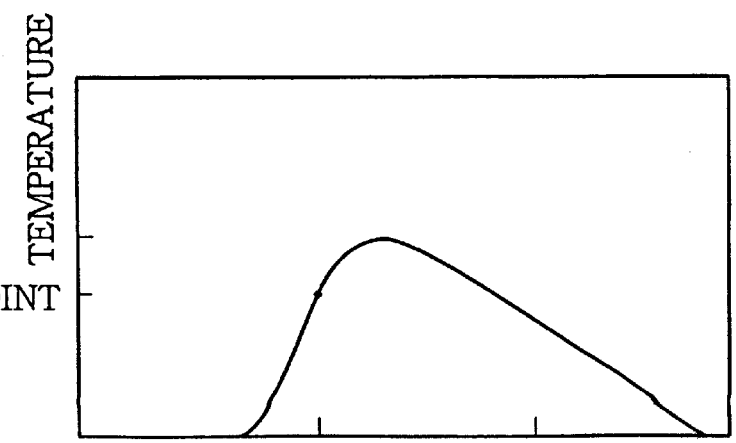

FIGS. 1a–1c indicate an optical recording medium in which a reproduction auxiliary layer 3 is in a crystallized state at room temperature. An area being irradiated by a laser beam will generally be of a circular form, but the high rotating speed of the optical recording medium will cause the circular form to become elliptical in form. This is an area having a temperature higher than its melting point.

Figure 2:
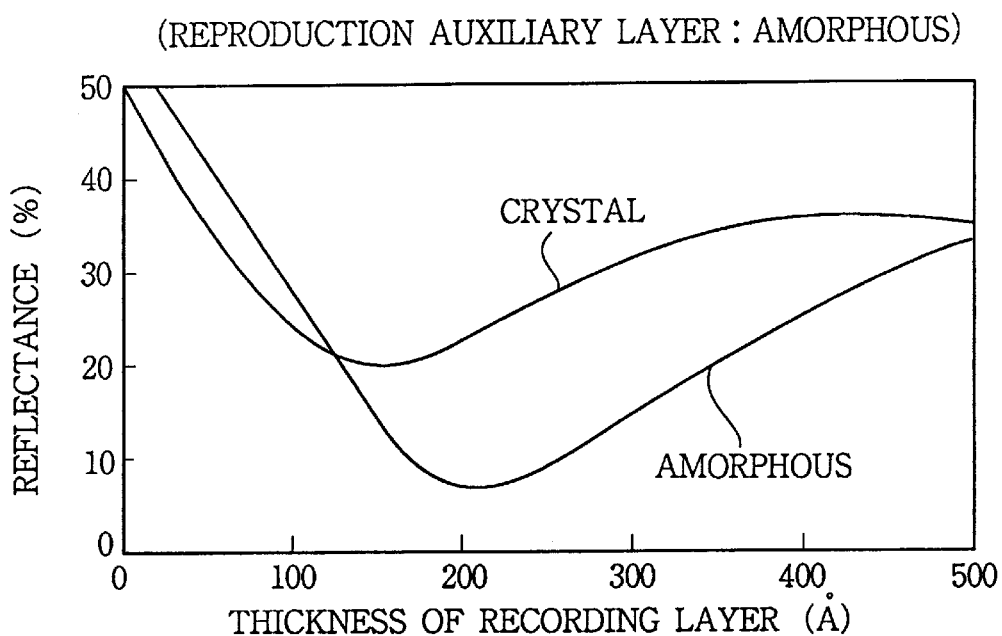
FIG. 2a is a graph showing a relationship between the thickness of a recording layer and a reflectance.
FIG. 2b is a graph showing another relationship between the thickness of a recording layer and its reflectance.
Figure 2:
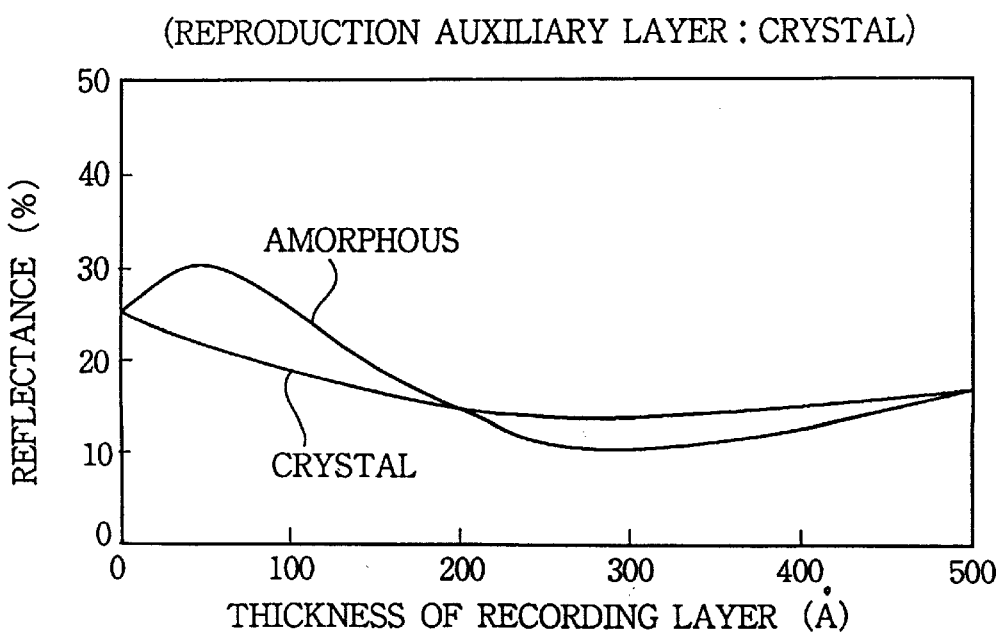

FIGS. 2a and 2b are graphs each showing a relationship between the thickness of a recording layer and the reflectance of a light reflected therefrom. As understood in FIGS. 1a, 1b and FIG. 2a, when the thickness of a recording layer 4 is 200 angstrom, in a reproducing area 8 which is covered by both the laser beam spot and the high temperature area 7 and corresponds to the amorphous area of the reproduction auxiliary layer 3, there will be a reflectance variation due to different areas (crystallized state and amorphous state), thus ensuring high density information reproduction.

Figure 3:
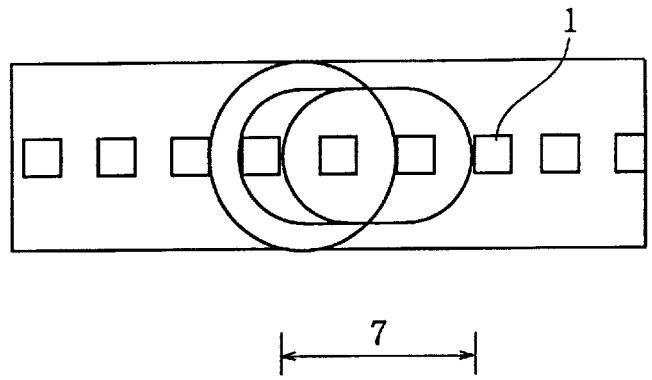
Figure 3:
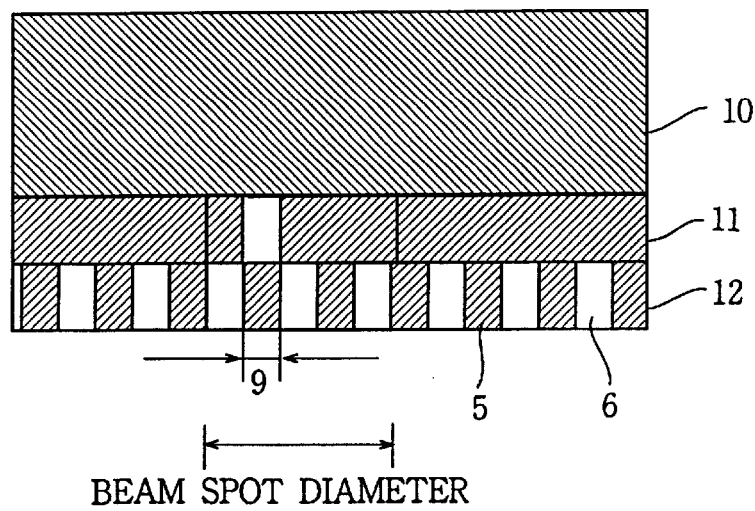
Figure 3:
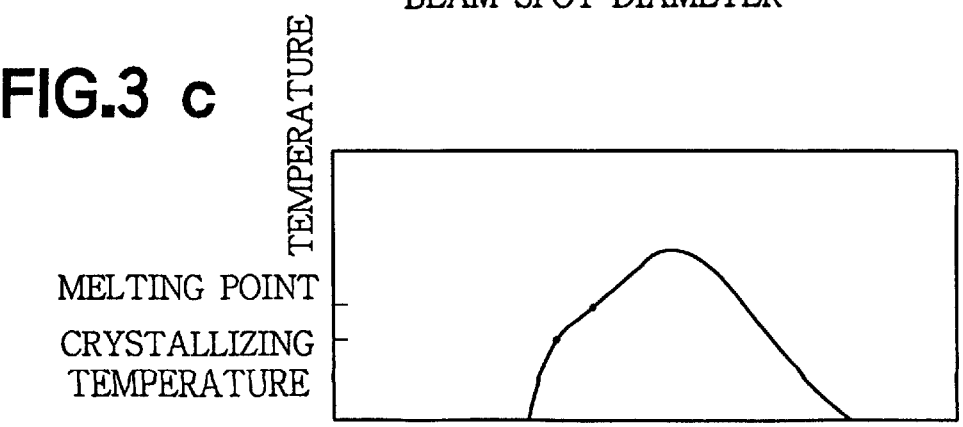

FIGS. 3a–3c indicate another optical recording medium. The reproduction auxiliary layer 11 in FIG. 3b is in an amorphous state under room temperature. Also, an area of elliptic form having a temperature higher than the melting point is formed extending from the center of the laser beam spot, and a crescent-shaped reproducing area 9, having a crystallizing temperature, is formed before the elliptic high temperature area.

Figure 4:
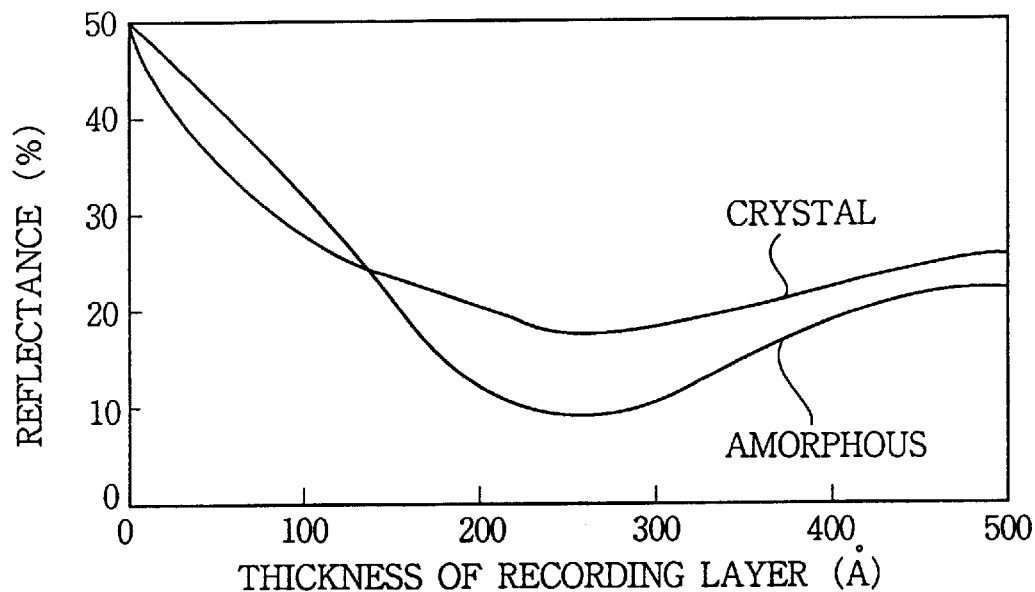
Figure 4:
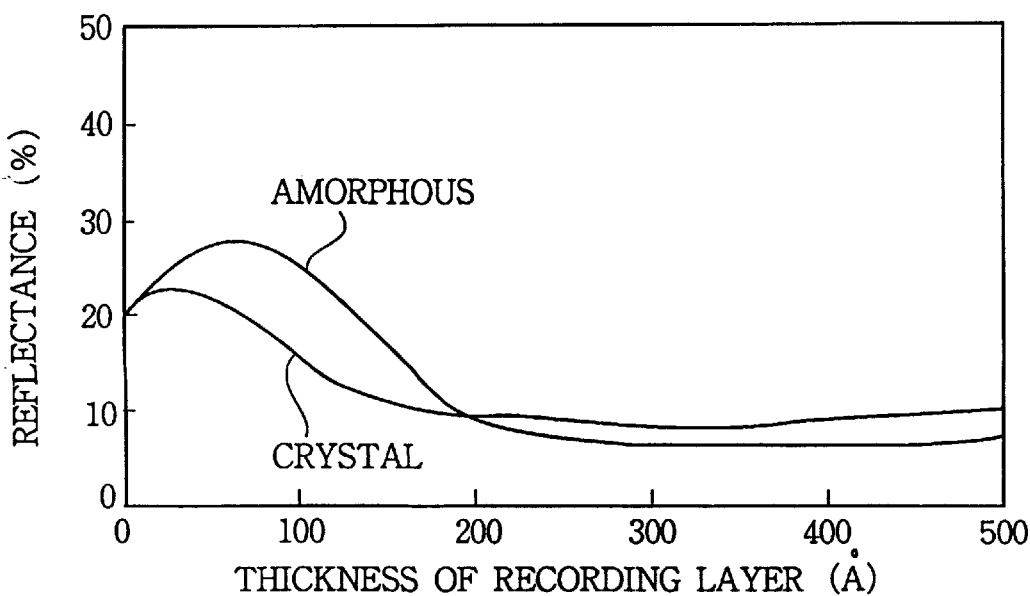

As shown in FIGS. 3a, 3b, and 4b, when the thickness of the recording layer 12 is 130 angstrom, in an area of the recording layer 12 corresponding to a crystallized area of the reproduction auxiliary layer 11, there will be a reflectance variation due to different areas (crystallized area 6 and amorphous area 5 of the recording layer 12), thus ensuring that higher density recorded information, than that shown in FIG. 2a, may be reproduced from a reproducing area 9 (crystallized area) covered by a laser beam spot.

The present invention will be described in more detail by way of the following examples.

EXAMPLE 1

Referring to FIG. 1b, an optical recording medium in this example comprises a transparent substrate 2, a reproduction auxiliary layer 3 formed immediately under the substrate 2, and a recording layer 4 formed under the auxiliary layer 3.

The reproduction auxiliary layer 3 is made of germanium/tellurium Ge—Te (when in its crystallized state n=5.8, k=3.6; when in its amorphous state n=4.3, k=O. 95. n: index of refraction, k: extinction coefficient). The material constituting the layer 3 is in a stabilized crystallized state at room temperature, but will change into an amorphous state when melted. Furthermore, as soon as the temperature is below melting point, it will quickly change back to the stabilized crystallized state. Layer 3, in this example, is composed of a material reversibly changeable between a crystallized state and an amorphous state, but it is also possible to use another material such as indium/antimony In—Sb, which is reversibly changeable from one crystallized state into another crystallized state.

The recording layer 4 is made of germanium/antimony/tellurium $Ge_2Sb_2Te_5$ (when in its crystallized state n=5.2, k=3.4; when in its amorphous state n=4.9, k=1.35). While at reproduction and room temperatures, the material will be in two states, i.e., a crystallized state and amorphous state. An area having information recorded therein may be in either a crystallized area 5 or an amorphous area 6 (FIG. 1b). Similar to reproduction auxiliary layer 3, which is used as the layer 4 in this example is a material reversibly changeable between a crystallized state and an amorphous state, but it is also possible to use another material which is reversibly changeable from one crystallized state to another crystallized state.

A difference between the reproduction auxiliary layer 3 and the recording layer 4 is that, an area of the layer 3 being irradiated by a laser beam is in an amorphous molten state but will change back to its original crystallized state once the laser beam moves away, whilst in the recording layer 4, after the laser beam has moved away both the amorphous state and crystallized state will remain without any change.

Although, it is apparent that the optical recording medium comprises a transparent substrate 2, a reproduction auxiliary layer 3 and a recording layer 4, dielectric layers (made of a material such as $ZnS.SiO_2$), may be interposed between the above layers for the purpose of cooling or heat accumulation. Since a certain amount of heat will be generated due to the laser beam irradiation the dielectric layers thus interposed are especially important in prohibiting transfer of heat to the recording layer 4.

The reproduction of the information recorded on the above-described optical recording medium may be explained as follows.

Referring to FIG. 1a, a laser beam spot having a circular form is produced by a light source having a light wave length of 780 nm and a numerical aperture of 0.45, the light reflected from a reproducing area 1 (for instance in an amorphous state even under room temperature) corresponding to a pit of a CD (compact disc) may be read so as to reproduce information recorded therein. Referring to FIG. 1b, when reading high density information recorded by numerous signal pits having a size of about $0.4\mu$, a laser beam having a spot size of $1.7\mu$ may be adjusted in its intensity and wave length, so that the high temperature portion (molten part having a temperature higher than the melting point, see FIG. 1c) of the beam spot may be adjusted to 0.8 $\mu m$, thereby obtaining a more reliable and effective laser beam spot.

Referring again to FIG. 1a, an amorphous molten area 7 exhibits a circular form when the optical recording medium is in a stopped condition, but the high rotating speed of the optical recording medium will elongate the circular form of the laser beam into an elliptical form extending from the center of the beam spot. Referring to FIGS. 1a and 1b, the common portions of the elliptical molten area 7 and the circular laser beam spot area will serve as an information signal reproducing area 8 (corresponding to the blank portion of the reproduction auxiliary layer 3), whilst other areas (corresponding to the hatching portions of the reproduction auxiliary layer 3) are masked.

Here, an area of the reproduction auxiliary layer 3 corresponding to the information signal reproducing area 8 is in an amorphous state.

Furthermore, the thickness of the reproduction auxiliary layer 3 is limited by the extinction coefficient k, the thickness of the layer 13 in this example is 50–500 angstrom, preferably 100 angstrom.

When the thickness of the reproduction auxiliary layer 3 is set to be 100 angstrom and the thickness of the recording layer 4 is set to be 200 angstrom, there will be a reflectance difference of about 10% between the crystallized area and the amorphous area of the recording layer 4 corresponding to information signal reproducing area 8. Accordingly, by detecting lights reflected from such an optical recording medium, it is possible to reproduce high density information, having a pit size of about $0.4\mu$, recorded on the recording layer 4.

However, in areas other than he information signal reproducing area 8, since there are almost no reflectance differences between the crystallized and amorphous portions of the recording layer 4, it is impossible to reproduce any information therefrom.

Referring to FIG. 2a, when the thickness of the recording layer 4 is 200 angstrom, the reflectance of a crystallized area is greater than that of an amorphous area. However, it is also possible to use a material whose crystallized area has a smaller reflectance than its amorphous area. In fact, the thickness of the recording layer 4 can be in a range of 180–400 angstrom. In any condition with the recording layer 4, a reflectance ratio (a difference between a maximum reflected light and a minimum reflected light with respect to a shortest pit length: a difference between a maximum reflected light and a minimum reflected light) should be at least 30%.

EXAMPLE 2

Referring to FIG. 3b, an optical recording medium in this example comprises a transparent substrate 10, a reproduction auxiliary layer 11 formed immediately under the substrate 10, and a recording layer 12 formed under the auxiliary layer 11.

The reproduction auxiliary layer 11 is made of germanium/antimony/tellurium $Ge_2Sb_2Te_5$ (when in its crystallized state n=5.2, k3.4 when in its amorphous state n=4.9. k=1.3). The material constituting the layer 11 is a phase change material which is in a stabilized amorphous state under room temperature or at a temperature higher than its melting point. For instance, at room temperature the reproduction auxiliary layer 11 as a whole is in a solid amorphous state, but will change into a molten amorphous state upon being irradiated by a laser beam. Additionally, as indicated in FIG. 3c, a portion having a crystallizing temperature lower than its melting point will occur adjacent to the molten area. As soon as the laser beam spot moves away, the irradiated portion (molten amorphous area) will change back to a solid amorphous state, and the crystallized areas will also change to a solid amorphous sate.

The recording layer 12 is made of indium/silver/ antimony/tellurium InAgSbTe (when in its crystallized state n=4.04, k=3.28; when in its amorphous state n=4.5, k=1.48). At both reproduction and room temperatures, the material will be in two states, i.e., a crystallized state and an amorphous state. An area 9 having information recorded therein may be either a crystallized area or an amorphous area (FIG. 3b). The material used as the layer 12 in this example, is reversibly changeable between a crystallized state and an amorphous state, but it is also possible to use another material reversibly changeable from one crystallized state to another crystallized state. The recording layer 12, in this example, after the laser beam spot has moved away, both the amorphous state (for instance, having information recorded therein) and crystallized state will remain in their present form without any change.

Although, the optical recording medium, in this example, comprises a transparent substrate 2, a reproduction auxiliary layer 3 and a recording layer 4, it is allowable to interpose a dielectric material between the above layers for the purpose of cooling or heat accumulation.

The reproduction of the information recorded in the above-described optical recording medium may be explained as follows.

By adjusting the power intensity of a recording laser beam, a molten portion will be formed within the laser beam spot. Referring again to FIG. 3a a molten (amorphous) area 7 has a circular form when an optical recording medium is in a stopped condition, but the high rotating speed of the optical recording medium will cause the circular form to be elongated into an elliptical form extending from the center of the beam spot.

Here, an area 9 having a crystallizing temperature lower than its melting point will occur adjacent to the molten (amorphous) area within the beam spot, as indicated in FIGS. 3a–3c. Therefore, the information signal recorded in the recording layer 12 may be reproduced at a high density, from the area 9 having such a crystallizing temperature.

Furthermore, as shown in FIG. 3b, the edge portions of the crystallizing temperature area 9 and the inner portion of the laser beam spot are in an amorphous (molten) state, and the information signal of the recording layer 12 will be masked by way of multiple optical interference, just as are the areas (solid amorphous state) outside of laser beam spot. Therefore, it is possible to prevent the deterioration of a MTF (modulation transfer function) which can be caused due to a variation in the power of the laser output. Moreover, as illustrated in FIG. 3a, since the crystallizing area 9 has a crescent form, it is possible to reproduce an information signal at a higher density than the optical recording medium described in example 1.

In addition, referring to FIGS. 3a–3c, the molten (amorphous) area 7 will become larger or smaller corresponding to the variation in the laser power output, and such a variation will also cause a shift of the crystallizing temperature area 9 in the beam scanning direction. However, it has been proven that the area 9 will maintain a stabilized width without any change, thereby ensuring stabilized and reliable information reproduction.

In this example, the information reproducing area 9 of the reproduction auxiliary layer 11 is in its crystallized state, the thickness of the layer 11 is 100 angstrom. However, the recording layer 12 comprises a crystallized area and an amorphous area.

In this example, when (i) the reproducing area 9 is in its crystallized state, (ii) other areas within the laser beam spot are in their molten amorphous state, (iii) the areas outside of the laser beam spot are in a solid amorphous state, (vi) the thickness of the recording layer 12 is 130 angstrom, the reflectance difference between crystallized area and the amorphous area of the recording layer 12 will be about 10% as indicated in FIG. 4b. Therefore, from the detecting light reflected from such an optical recording medium it is possible to reproduce, in high density, the information signal of $0.4\mu$ or less recorded in the recording layer 12.

In an area within the laser beam spot but outside of the information reproducing area 9, the light reflectance will be 25%. But, since there is almost no reflectance difference between crystallized and amorphous areas of the recording layer 12 corresponding to such an area, it is impossible to effectuate any information reproduction.

In this example, the thickness of the recording layer 12 is 130 angstrom, the reflectance of an amorphous area is greater than that of a crystallized area. However, it is also possible to use a material whose amorphous area has a smaller reflectance than its crystallized area. In fact, the thickness of the recording layer can be in a range of 50–150 angstrom. In any condition with the recording layer 12 a reflectance ratio, as in example 1, should be at least 30%.

In this example, it is preferable that the thickness of the recording layer 12 be 130 angstrom. This is because when the thickness of the recording layer 12 is 130 angstrom, corresponding to the crystallized area of the reproduction auxiliary layer 11 which is within the laser beam spot, information reproduction is possible due to the reflectance difference as shown in FIG. 4b. On the other hand, corresponding to the amorphous molten area of the reproduction auxiliary layer 11 which is also within the laser beam spot, information reproduction is impossible because no reflectance difference exists as indicated in FIG. 4a.

In both, example 1 and example 2, the materials which have been used to form a recording layer and a reproduction auxiliary layer are Ge—Te, In—Sb, $Ge_2Sb_2Te_5$, InAgSbTe. However, it is possible to use, as a phase change material reversibly changeable between an amorphous state and a crystallized state, $TeTeO_2GeSn$, TeGeSnAu, GeTeSn, GeTeSbS, SnSeTe, SbSeTe, SbSe, GaSeTe, GaSeTeGe, InSe, InSeTICo, GeTeSb. As a material reversibly changeable from one crystallized state to another crystallized state, it is possible to use AgZn, CuAINi, InSbSe, InSbTe.

Furthermore, in both the examples 1 and 2, it is also possible that the recording layers and reproduction auxiliary layers contain some organic or inorganic coloring materials, and some photochromic materials capable of changing from one (optical constant) state to another without any thermal reactions.

As understood in the above description, since the optical recording medium and the reproduction method thereof according to the present invention, are suitable for reproducing at high density the information recorded in optical recording medium, they are also suitable for use with an optical recording medium of the Write Once Read Many type and the Rewritable type, Also, by providing an information reproducing area and a masked area respectively, it is possible to increase the reflectance of the masked area so as to ensure the necessary amount of reflected light for the focus servo, and at the same time to ensure the necessary reflectance for information reproduction.

The reflectance of the masked area may be easily controlled by controlling the thicknesses of the recording layer and the reproduction auxiliary layer.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A re-writable type optical recording medium comprising:

a reproduction auxiliary layer including a first phase change material reversible between a crystalline state and an amorphous state, the states having different optical constants, wherein the reproduction auxiliary layer is in a first state at room temperature and only a selected portion of the reproduction auxilary layer changes from the first state to a second state while the selected portion is being irradiated by a laser beam during reproduction, a recording layer including a second phase change material different from the first phase change material, located below the reproduction auxilary layer, having a plurality of portions capable of reversibly changing between an amorphous state and a crystalline state during a recording operation and remaining unchanged during reproduction, wherein the amorphous state and the crystalline state have different optical constants representing information recorded thereon;

wherein the optical recording medium has approximately the same reflectance from areas of the reproduction auxilary layer in the first state so as to form a mask area during reproduction, and the optical recording medium has a different reflectance depending upon the optical constant of the recording layer portion under the selected portion of the reproduction auxilary layer in the second state.

2. The optical recording medium of according to claim 1, wherein the recording layer has a thickness of about 50 to about 300 angstrom.

3. A method of reproducing information recorded on a re-writable type optical recording medium including a recording layer for recording and storing information, comprised of a phase change material having a plurality of portions capable of reversibly changing during a recording operation between an amorphous state and a crystalline state to represent information recorded thereon, and a reproduction auxilary layer comprised of a phase change material different from the recording layer capable of changing during reproduction between an amorphous state and a crystalline state having different optical constants, said method comprising the steps of:

irradiating the reproduction auxilary layer with a laser beam to change a selected portion of the reproduction auxilary layer from a room temperature state to an irradiated state;

reproducing information recorded on the recording layer from an area under the selected portion of the reproduction auxilary layer, the optical constant of which changes due to laser irradiation;

wherein the selected portion of the reproduction auxilary layer temporarily changes from the room temperature state to the irradiated state at a temperature higher than its melting point while being irradiated by the laser beam during reproduction to allow detection of the information recorded on the recording layer beneath the selected portion, and the recording layer remains unchanged during reproduction and is reversibly changeable during recording when irradiated at a temperature higher than the melting point for the reproduction auxilary layer.

4. A re-writable type optical recording medium comprising:

a recording layer including a phase change material having a plurality of portions capable of reversibly changing between an amorphous state and a crystalline state for storing data, wherein the amorphous state and crystalline state have different optical constants representing information recorded thereon; and a reproduction auxilary layer including a phase change material different from the recording layer for retrieving data including a portion that changes between a crystallized state and an amorphous state during retrieval of data from the recording layer as a laser beam is applied to the portion, wherein during data retrieval a selected portion of the material in the reproduction auxilary layer changes from a first to a second state upon being irradiated by a laser beam while the recording layer remains unchanged, and the material remaining in the first state in the reproduction auxilary layer forms a mask area during data retrieval, allowing detection of the information recorded on the recording layer under the selected portion of the reproduction auxilary layer in the second state.

5. The recording medium of claim 4 wherein the first state of the material in the reproduction auxilary layer is the crystalline state, and the second state of the material in the reproduction auxilary layer is the amorphous state.

6. The recording medium of claim 4 wherein the reproduction auxilary layer material is in the amorphous state at room temperature and a selected portion changes to the crystalline state upon being irradiated by a laser beam.

7. The recording medium of claim 6 wherein the laser beam is multiple-reflected on an interface between the recording layer and the reproduction auxilary layer and produces a reflected light serving as an information producing signal or servo signal.

8. The recording medium of claim 5 wherein the laser beam is multiple-reflected on an interface between the recording layer and the reproduction auxilary layer producing a reflected light serving as an information producing signal or servo signal.

9. The recording medium of claim 7 wherein the reflected light has multiple components each having a different optical constant.

10. The recording medium of claim 8 wherein the reflected light has multiple components each having a different optical constant.

* * * * *